(12) United States Patent
Brannon, Jr. et al.

(10) Patent No.: US 8,081,746 B2
(45) Date of Patent: Dec. 20, 2011

(54) CONFERENCE BRIDGE WITH IMPROVED HANDLING OF CONTROL SIGNALING DURING AN ONGOING CONFERENCE

(75) Inventors: Arthur L. Brannon, Jr., Naperville, IL (US); Gregory A. Freitag, Batavia, IL (US); Gerald W. Pfleging, Batavia, IL (US); George P. Wilkin, Bolingbrook, IL (US)

(73) Assignee: Alcatel Lucent, Paris (FR)

( * ) Notice: Subject to any disclaimer, the term of this patent is extended or adjusted under 35 U.S.C. 154(b) by 1246 days.

(21) Appl. No.: 11/805,008

(22) Filed: May 22, 2007

(65) Prior Publication Data

US 2008/0292081 A1    Nov. 27, 2008

(51) Int. Cl.
*H04M 3/56* (2006.01)

(52) U.S. Cl. .................................. 379/202.01; 370/260

(58) Field of Classification Search ............. 379/202.01, 379/88.01–88.28, 406.08; 370/260
See application file for complete search history.

(56) References Cited

U.S. PATENT DOCUMENTS

| | | | | |
|---|---|---|---|---|
| 5,483,588 A * | 1/1996 | Eaton et al. | ............... | 379/202.01 |
| 6,700,977 B2 * | 3/2004 | Sugiyama | ................ | 379/406.08 |
| 7,206,572 B2 * | 4/2007 | Luneau | ......................... | 455/415 |
| 7,280,650 B2 * | 10/2007 | Miao | ........................ | 379/202.01 |
| 7,630,481 B2 * | 12/2009 | Kafka | ....................... | 379/211.02 |
| 7,761,292 B2 * | 7/2010 | Ferencz et al. | ................ | 704/226 |
| 2007/0086365 A1 * | 4/2007 | Chen et al. | ..................... | 370/260 |

* cited by examiner

*Primary Examiner* — Davetta W Goins
*Assistant Examiner* — Phan Le
(74) *Attorney, Agent, or Firm* — Carmen Patti Law Group, LLC

(57) ABSTRACT

In an exemplary method audible signals from participants of a conference call during the ongoing conference call are processed by a conference bridge. An incoming audible signal on a first line from a first participant is detected during the conference call with a plurality of other conference call participants coupled via corresponding other lines. The audible signal on the first line is automatically attenuated before information on the first line is summed into a common signal that is transmitted to the other conference call participants. This prevents the other participants from hearing the audible signal during the ongoing conference call.

10 Claims, 2 Drawing Sheets

CONFERENCE BRIDGE WITH IMPROVED HANDLING OF CONTROL SIGNALING DURING AN ONGOING CONFERENCE

BACKGROUND

This invention relates to conference bridges that support conference calls in a telecommunication system and more specifically to how a conference bridge handles signaling from users during an ongoing telephone conference call.

A conference calling feature has been made available to subscribers by telecommunication service providers in the United States for some time. Using a common analog POTS telephone, a user desiring to simultaneously talk with two other parties can activate a conference calling feature provided by the telecommunication service provider. Touchtone signals are entered by the user to signal the desired implementation of a conference call to the supporting central office switch. Typically this service is limited to a three party conference call. Because of the small number of parties to the conference call, there is no need for further signaling once the conference call has been established.

Conference calling services, such as for a business meeting, involving a substantial number of parties is also available from telecommunication service providers and private services. Arrangements to conduct such a conference call are normally scheduled ahead of the time and date of the conference call with the service provider followed by notices being sent to the invited participants. One participant, typically the person organizing the conference call, functions as a host during the conference call and usually serves as the predominant speaker. Invited participants call a designated telephone number at the time of the conference call and are manually or automatically joined into the conference. A participant, who is not the host, is normally required to enter one or more touchtone signals during the conference call in order to request permission to speak to the other conference call members. This protocol is followed in order to prevent a possibly chaotic situation in which several of the participants attempt to speak at the same time. It may also be necessary to switch or change of the characteristics of the line of a participant who is to speak in order to maintain appropriate audio levels.

Although the use of the touchtone signals as control commands has generally proved effective, the transmission of the touchtone sounds can be disturbing to participants of the ongoing conference call. For example, one or more participants may desire to speak by transmitting the touchtone command signals during the conference call at a time when the host is not agreeable to take questions or open the conference to discussion by other participants. Such touchtone signals can be disturbing and/or disruptive to the other participants, and may impair the understanding of any concurrent spoken words. It is possible for the conference service provider to split the transmit and receive audio paths of the participants so that the transmit path of each participant is connected only to an operator rather than the other participants of the conference call. In this way, a person who desires to obtain the floor and speak to the other participants must obtain permission through an operator before the transmit audio path of that person is connected under the control of the operator to the conference. Of course, this means that the cost of such service will be higher than a service that does not require active intervention by an operator. Therefore, a need exists for improved handling of touchtone signaling commands by participants during an ongoing conference call.

SUMMARY

It is an object of the present invention to satisfy this need.

In an exemplary method audible signals from participants of a conference call during the ongoing conference call are processed by a conference bridge. An incoming audible signal on a first line from a first participant is detected during the conference call with a plurality of other conference call participants coupled via corresponding other lines. The audible signal on the first line is automatically attenuated before information on the first line is summed into a common signal that is transmitted to the other conference call participants. This prevents the other participants from hearing the audible signal during the ongoing conference call.

An embodiment of a conference bridge that implements the above method is also part of the present invention.

DESCRIPTION OF THE DRAWINGS

Features of exemplary implementations of the invention will become apparent from the description, the claims, and the accompanying drawings in which:

DETAILED DESCRIPTION

Figure 1:
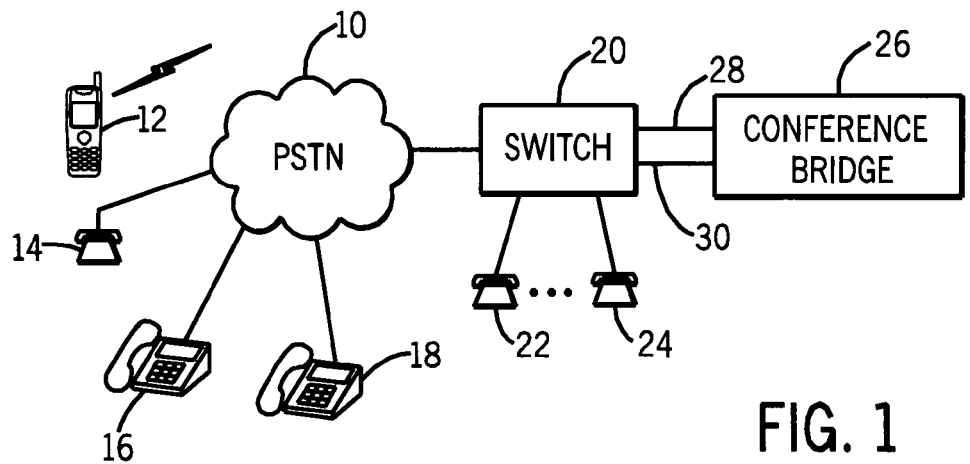
FIG. 1 is a block diagram of a communication system suited for incorporation of an embodiment of the present invention.

FIG. 1 shows an illustrative telecommunication system in which the public switched telephone network (PSTN) 10 supports various types of subscriber devices including the cellular telephone 12, an analog POTS telephone 14, an integrated digital subscribers network (ISDN) telephone 16, and that Internet protocol (IP) telephone set 18. All of the supporting infrastructure equipment and networks associated with these subscriber devices are contained within the overall PSTN 10. Because the supporting infrastructure equipment and networks operate in a conventional way, a detailed explanation of their operation is not required in order to understand the exemplary embodiment of the present invention described below.

A central office switch 20, which is connected to PSTN 10, supports the origination and termination of calls for telephone devices supported by it. For example, switch 20 may support a plurality of telephones 22-24. It also supports a conference bridge 26 which is connected to switch 20 by a trunk line 28 and a signaling line 30. The trunk line 28 is representative of one or more trunk lines, each capable of supporting bidirectional communications for a plurality of telephone lines. This permits the conference bridge 26 to simultaneously support a substantial plurality of participants of a conference call. Signaling line 30 supports command and control signaling between the conference bridge 26 and switch 20. Alternatively, one channel carried by the trunk line 28 could be used to carry control signaling between the conference bridge 26 and switch 20.

Figure 2:
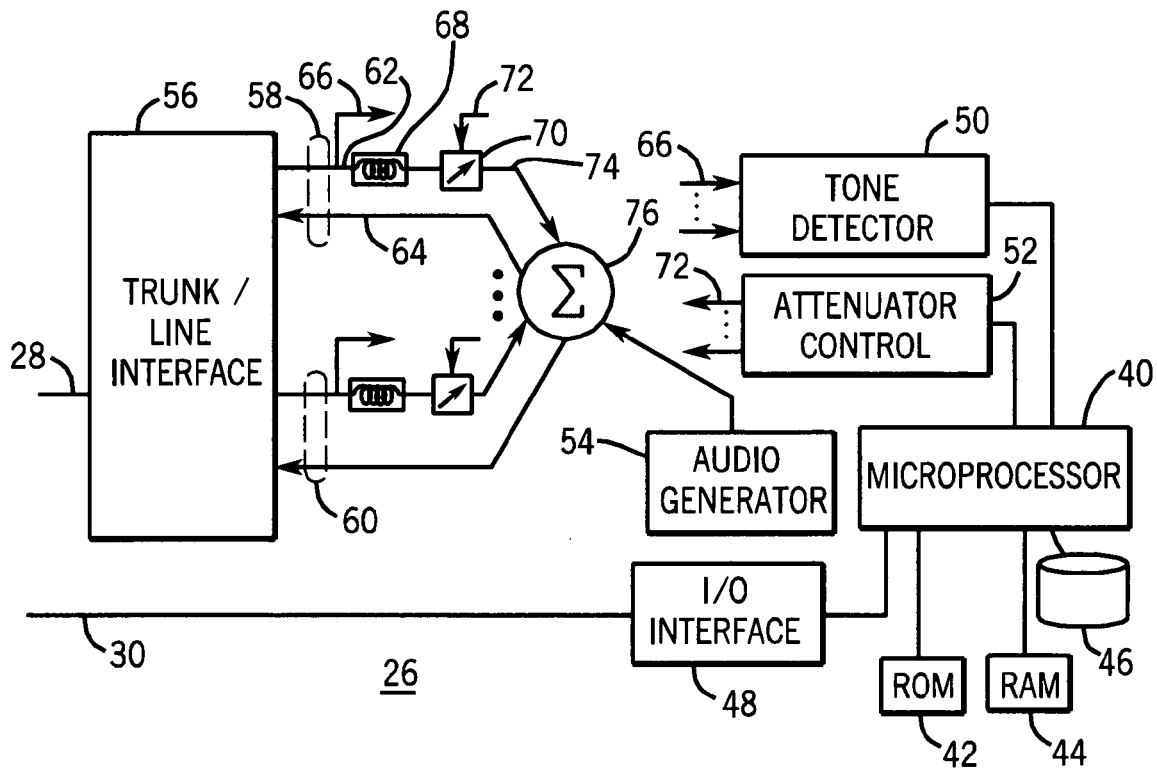
FIG. 2 is a diagram of an illustrative embodiment of the conference bridge shown in FIG. 1.

FIG. 2 is a block diagram of an illustrative embodiment of conference bridge 26. A microprocessor 40 is supported by read-only memory (ROM) 42, random access memory (RAM) 44 and nonvolatile storage device 46 which may consist of a hard drive. An input/output interface 48 is coupled to the microprocessor 40 and enables the conference bridge 26 to receive and transmit command and control signals by channel 30. The microprocessor 40 operates under stored program control instructions and enables the conference bridge to provide call conferencing functions including enhanced handling of participant signaling described below The microprocessor 40 is also connected to and supports tone detector 50, attenuator control 52, and audio generator 54. The tone detector 50, which may comprise an available integrated circuit tone detector, functions to detect the presence of inbound touchtone signals on lines carrying audio from participants of the conference. The attenuator control 52 may comprise a series of latches utilized to control attenuators associated with incoming audio lines from the participants. Depending upon whether the corresponding attenuator operates only in an on/off state or provides continuously variable attenuation, the attenuator control will operate accordingly to provide either on/off state control or a variable control voltage that will determine a corresponding amount of attenuation provided by the attenuator. The audio generator 54 is used to generate audio that can be supplied to the participants of the conference call. Additional explanation of the functionality of these elements is provided below.

A trunk/line interface module 56 is connected to the trunk line 28 and functions as a multiplexer/demultiplexer that converts the plurality of voice channels carried by trunk line 28 into separate pairs of inbound and outbound lines for each of the trunk channels. Only two representative line pairs 58 and 60 are shown. Because the elements associated with each of the line pairs are identical, only the elements associated with line pair 58 need be described.

Line pair 58 includes an inbound line 62 carrying audio information input by a participant and an outbound line 64 that carries audio information to be transmitted to the corresponding participant. A tap 66 off of line 62 is coupled to the tone detector 50 and provides a sample of the incoming audio information that is processed by the tone detector to determine the presence of a touchtone signal. A delay line 68 is connected in series with line 62 and serves to delay the inbound audio. The output of the delay line 68 is coupled to a controllable attenuator 70 that is used to provide selective attenuation of the inbound audio information. A control input 72 of the attenuator 70 is coupled to the attenuator control module 52 which provides a control signal to the attenuator. If the attenuator 70 is selected to provide only an on/off operation and hence function as a switch, the attenuator control module will provide only an ON and OFF control voltage. If the attenuator 70 is selected to provide controlled variable attenuation, the attenuator control module 52 will supply a variable control voltage to control input 72 where the supplied control voltage causes the attenuator to provide a corresponding amount of attenuation in accordance with a known voltage/attenuation curve. The output of attenuator 70 is carried by line 74 to a summation module 76. The function of summation module 76 is to combine received audio input information into a common signal, provide amplification of the common signal if needed, and transmit the common signal to each of the conference participants. For the participant associated with line pair 58, the common signal is transmitted to the participant on line 64.

Figure 3:
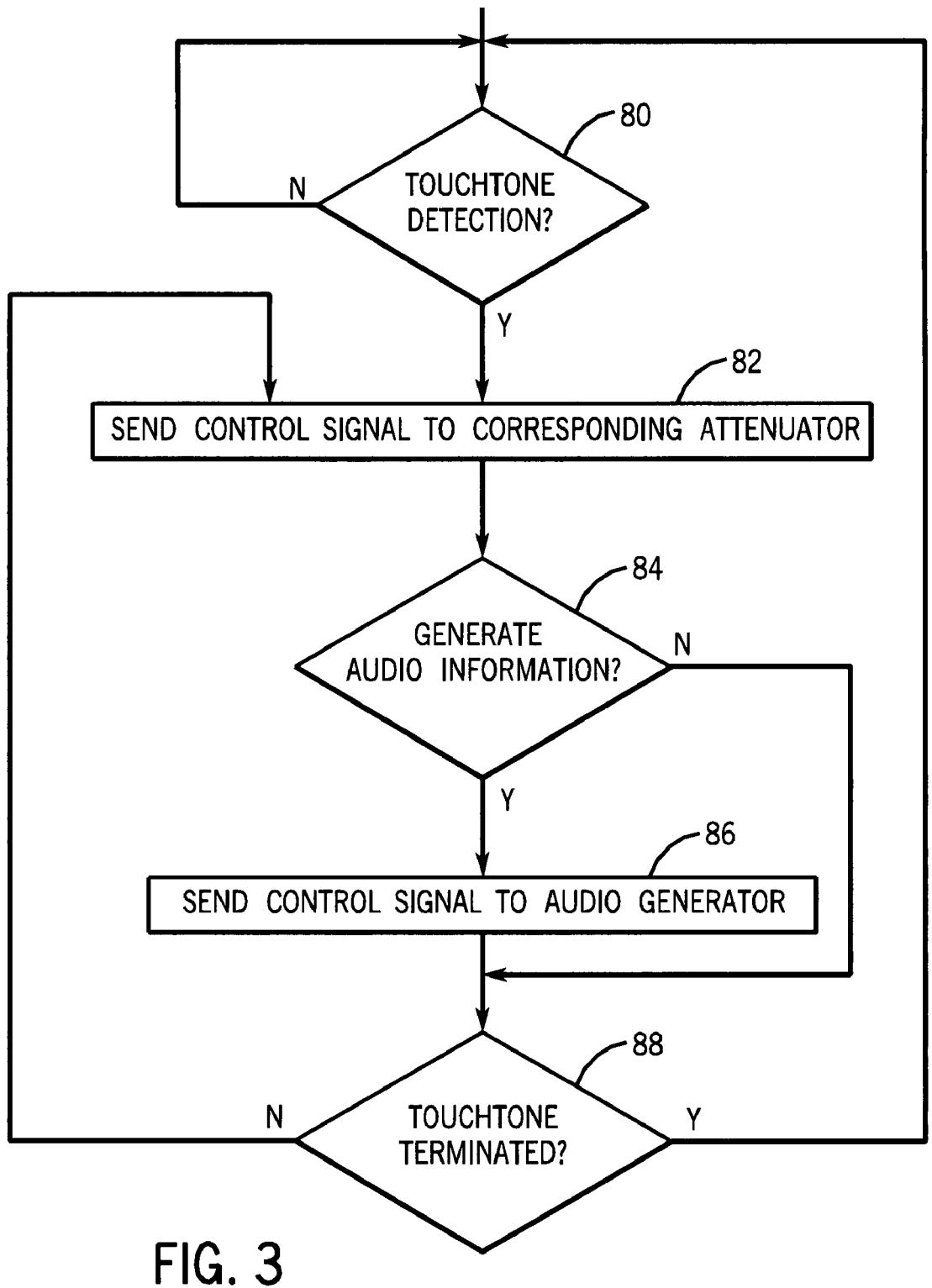
FIG. 3 is a flow diagram of steps of an illustrative method in accordance with the present invention.

FIG. 3 is a flow diagram of an illustrative embodiment of a method in accordance with the present invention. A determination is made in step 80 of whether a touchstone has been detected. A NO determination returns processing to the input of step 80 and corresponds to a continuing monitoring for the detection of a touchtone. It will be understood that each of the conference participant lines is being monitored for the presence of a touchtone. A YES determination by step 80 results on the microprocessor 40 causing the attenuator control module 52 to send a control signal to the corresponding attenuator associated with the inbound line of the participant on which a touchtone was detected. In this example, the attenuator operates in an on/off mode so that the control signal will cause the attenuator, which is normally in the ON state, to a transition to the OFF state. In step 84 a determination is made by the microprocessor of whether audio information should be generated during the time of the occurrence of the touchtone. A YES determination by step 84 results in the microprocessor 40 sending a control signal to the audio generator 54 causing the audio generator to generate audible information that is coupled to the summation module 76. A NO determination by step 84 or the completion of step 86 results in the determination made by step 88 of whether the detected touchtone has been terminated, i.e. the touchtone ceases to be detected. A NO determination by step 88, indicating that the touchtone a still present, returns processing to the beginning of step 82. A YES determination by step 88, indicating that the touchtone is no longer present, returns processing to the beginning of step 80, i.e. monitoring continues for the potential generation of another touchtone.

It should be noted that the incoming audio information as sensed by tone detector 50 is taken prior to the delay introduced by delay line 68. The purpose of the delay line 68 is to introduce a predetermined time delay of sufficient duration to permit detection of a touchtone by the tone detector, subsequent processing by microprocessor 40, generation of an appropriate signal from the attenuator control module 52, response time of the corresponding attenuator, and generation of audible information by audio generator 54. This allows the incoming touchtone from the participant to be effectively muted by the corresponding attenuator 70 prior to the touchtone signal reaching summation node 76, and hence prior to it being rebroadcast to all of the other participants.

The audible information generated by the audio generator 54 in response to the detection of an incoming touchtone signal from an associated participant can be selected by the administrator of the conference bridge or by the host of the conference call. In one configuration, no audible information is caused to be generated by the audio generator during the detection of an incoming touchtone. In this scenario it is assumed that merely introducing a period of silence in place of the touchtone on the inbound audio line of the participant transmitting the touchtone will not cause a significant change in the common summed signal due to the substantial magnitude of audio contributions from the other participants. This operation spares the other participants from hearing the touchtone which is normally of a magnitude to be disruptive and potentially obscuring speech of the participant or host who has the floor at the time of the touchtone generation by a participant.

Alternatively, while still muting the touchtones, a predetermined audio message can be generated by the audio generator 54 and introduced into the common summed audio output to be heard by all of the participants. For example, assume that the participant associated with the line pair 58 transmits a touchtone which corresponds to a request for permission to take the floor, i.e. become the speaker or co-speaker with another, e.g. the host. Although the touchtone, or series of touchtone signals, from the requesting participant is muted, the receipt of the touchtone request is also processed by the microprocessor for control purposes in addition to the muting as per the embodiment of the present invention. The microprocessor may be programmed to take action automatically upon receipt of this request, e.g. grant the participant access to the floor, or to notify the host of the request and seek a decision on the request from the host. Assuming that the participant is to be granted access to the floor, the microprocessor can send a control signal identifying the specific audio to be generated by the audio generator. For example, the spoken names of each of the participants to the conference call can be stored and upon the grant of access to the floor, the stored name of the participant receiving the grant can be transmitted to the summation node 76 so that the identity of the new speaker will be made known to all of the participants. Either the audio generator itself can store this information or the information can be stored in the hard drive 46 and transmitted by the microprocessor to the audio generator. Of course, the audio message action transmitted to the participants can include more than the spoken name. The message could for example include additional identifying information such as, "the new speaker is John Smith". Instead of a person's name, the new participant to gain the floor could be identified by the name of a group affiliation, i.e. "systems engineering", or a location, i.e. "Chicago sales". The microprocessor will have access to available information that identifies the line pair, e.g. terminating port number identification, of a particular participant, e.g. the participant can be identified based on incoming calling line identification or upon information provided by participant on initial login to the conference call and stored for later use.

The conference bridge illustrated in FIG. 2 focuses on those features and elements that are most relevant to the embodiments of the present invention. It will be understood that additional common functionality traditionally provided by a conference bridge will also be provided. These known aspects are omitted for the benefit of clarity and explanation of the embodiment of the present invention.

Although exemplary implementations of the invention have been depicted and described in detail herein, it will be apparent to those skilled in the art that various modifications, additions, substitutions, and the like can be made without departing from the spirit of the invention. For example, the elements of the illustrative conference bridge may be integrated into fewer components and the steps of the method can be altered or rearranged. The microprocessor can assume the functions of other elements, e.g. elements 50, 52 and/or 54 if desirable. The construction of a digital implementation will be appreciated by those skilled in the art in view of the teachings herein. Depending on the processing capabilities of the microprocessor and the number of lines to be simultaneously processed, a DSP or auxiliary microprocessor could also be used to support the processing of the signals in the digital domain. The delay provided by delay line 68, the attenuation/switching provided by attenuator 70, and the summation by element 76 can also be implemented for digital domain signals. The audio introduced by the audio generator can be inserted into the line associated with the touchtone signaling participant instead of the at the summation node. Depending on the speed of operation of the tone detector, the microprocessor, attenuator control module and the audio generator, the delay lines may be omitted if acceptable performance can be achieved without the use of the delay. An audio message may also be used to provide the participants with other types of information and/or status of one participant, such as upon a request of the one participant to temporarily or permanently leave the conference call. Such requests may be made by corresponding touchtone signals or by other signaling, e.g. upon a hang-up/disconnect signal.

The scope of the invention is defined in the following claims.

We claim:

1. A method for processing audible signals from participants of a conference call during the ongoing conference call by a conference bridge comprising the steps of:
    detecting an incoming audible signal on a first line from a first participant during the conference call with a plurality of other conference call participants coupled via corresponding other lines; and
    automatically attenuating the audible signal on the first line before information on the first line is summed into a common signal that is transmitted to the other conference call participants, thereby preventing the other participants from hearing the audible signal;
    delaying information received on the first line so that non-delayed information and delayed information are formed, said detecting step detecting the incoming audible signal on the first line based on non-delayed information, said attenuating step attenuating the audible signal that is contained in the delayed information.

2. The method of claim 1 further comprising delaying information received on said other lines of the conference call as well as on the first line, said attenuating step attenuating the audible signal contained in the delayed information on the first line to produce a first attenuated signal, the delayed information on said other lines and the first attenuated signal being summed into said common signal.

3. The method of claim 1 further comprising the step of generating an audible message that is transmitted to said other conference call participants in response to receipt of the incoming audible signal from the first participant.

4. A conference bridge comprising:
    a tone detector means for detecting an incoming audible signal on a first line from a first participant during a conference call with a plurality of other conference call participants coupled via corresponding other lines; and
    means for automatically attenuating the audible signal on the first line before information on the first line is summed into a common signal that is transmitted to the other conference call participants, thereby preventing the other participants from hearing the audible signal;
    means for delaying information received on the first line so that non-delayed information and delayed information are formed, said detecting means detecting the incoming audible signal on the first line based on non-delayed information, said attenuating means attenuating the audible signal that is contained in the delayed information.

5. The conference bridge of claim 4 wherein said means for delaying delays information received on said other lines of the conference call as well as on the first line, said means for attenuating attenuating the audible signal contained in the delayed information on the first line to produce a first attenuated signal, the delayed information on said other lines and the first attenuated signal being summed into said common signal.

6. The conference bridge of claim 4 further comprising means for generating an audible message that is transmitted to said other conference call participants in response to receipt of the incoming audible signal from the first participant.

7. The conference bridge of claim 6 wherein said message includes identifying audible information that identifies the first participant.

8. The conference bridge of claim 7 wherein said message further includes audible status information of the status of the first participant.

9. The method of claim 1 wherein the delayed information is the non-delayed information delayed in time.

10. The conference bridge of claim 4 wherein the delayed information is the non-delayed information delayed in time by the means for delaying.

* * * * *